United States Patent
Brown (10) Patent No.: US 6,167,735 B1
(45) Date of Patent: Jan. 2, 2001

(54) BICYCLE CARRIER FASTENING BRACKET

(75) Inventor: Justin Tyler Brown, Jamaica Plain, MA (US)

(73) Assignee: Delta Cycle Corporation, Foxboro, MA (US)

( * ) Notice: Under 35 U.S.C. 154(b), the term of this patent shall be extended for 0 days.

(21) Appl. No.: 09/411,189

(22) Filed: Oct. 1, 1999

(30) Foreign Application Priority Data

Jan. 29, 1999 (TW) .............................................. 088201449

(51) Int. Cl.$^7$ .............................. B62H 5/06; E05B 71/00
(52) U.S. Cl. ................................. 70/19; 70/203; 70/234; 211/5; 224/924; 403/316
(58) Field of Search ....................... 70/19, 62, 233–235, 70/203, 212; 211/4, 5; 224/324, 924; 403/315, 316

(56) References Cited

U.S. PATENT DOCUMENTS

| | | | |
|---|---|---|---|
| 4,621,873 | * | 11/1986 | Weinstein et al. .................. 70/225 X |
| 4,724,692 | * | 2/1988 | Turin et al. ............................. 70/225 |
| 4,770,011 | * | 9/1988 | Constant ............................ 70/233 X |
| 4,842,148 | * | 6/1989 | Bowman ............................ 211/17 X |
| 4,934,572 | * | 6/1990 | Bowman et al. ................... 211/17 X |
| 4,951,487 | * | 8/1990 | Dennis .................................... 70/233 |
| 5,005,390 | * | 4/1991 | Giannini et al. ................... 70/233 X |
| 5,022,672 | * | 6/1991 | Kawai ................................. 280/281.1 |
| 5,265,897 | * | 11/1993 | Stephens ............................ 211/17 X |
| 5,291,763 | * | 3/1994 | Cuisinot ............................. 70/233 X |
| 5,337,587 | * | 8/1994 | Davidson ............................... 70/233 |
| 5,479,836 | * | 1/1996 | Chang ................................. 70/233 X |
| 5,511,894 | * | 4/1996 | Ng ......................................... 403/320 |
| 5,526,661 | * | 6/1996 | Lin ......................................... 70/233 |
| 5,598,959 | * | 2/1997 | Lorensen et al. ..................... 224/315 |
| 5,749,694 | * | 5/1998 | Ackerman et al. .................. 414/462 |
| 5,813,258 | * | 9/1998 | Cova et al. ............................ 70/225 |
| 6,044,673 | * | 4/2000 | Jefferson ................................ 70/212 |

* cited by examiner

Primary Examiner—Lloyd A. Gall
(74) Attorney, Agent, or Firm—Fish & Richardson P.C.

(57) ABSTRACT

A bicycle carrier fastening bracket has a main body, a base, and a leg extending from the base to support a tube defining a hole for receiving a threaded rod having threaded end engaged with a fast releasing nut. The threaded rod also has a head end and associated head end washer, the head end being engaged with a handle capable of eccentric motion. The tube has a slot for receiving an arresting washer, and there is a round hole in the leg. The handle has a grip with a locking hole corresponding in diameter to the round hole. The eccentric body fastening the handle regulates a distance between each of the threaded rod head end washer and the nut and its respective opposite end of the main body. The distance can be shortened to clamp a bicycle front fork when the handle is rotated to rest the grip against the leg, with the locking hole of the grip rested against the leg, so as to facilitate installation of a lock and confine displacement of the grip. The arresting washer, in a normal state with the bicycle front fork unfastened, impedes movement of the threaded rod, thereby preventing the threaded rod from sliding in the tube hole and maintaining each of the distances to enable the bicycle front fork to be fastened.

3 Claims, 8 Drawing Sheets

BICYCLE CARRIER FASTENING BRACKET

The invention relates generally to bicycles, and, more particularly, to brackets for fastening bicycles on bicycle carriers.

BACKGROUND OF THE INVENTION

Conventional bicycle carriers are designed to be mounted on the trunk lid of an automobile, and include means for fastening the front fork of a bicycle to the carrier.

Figure 1:
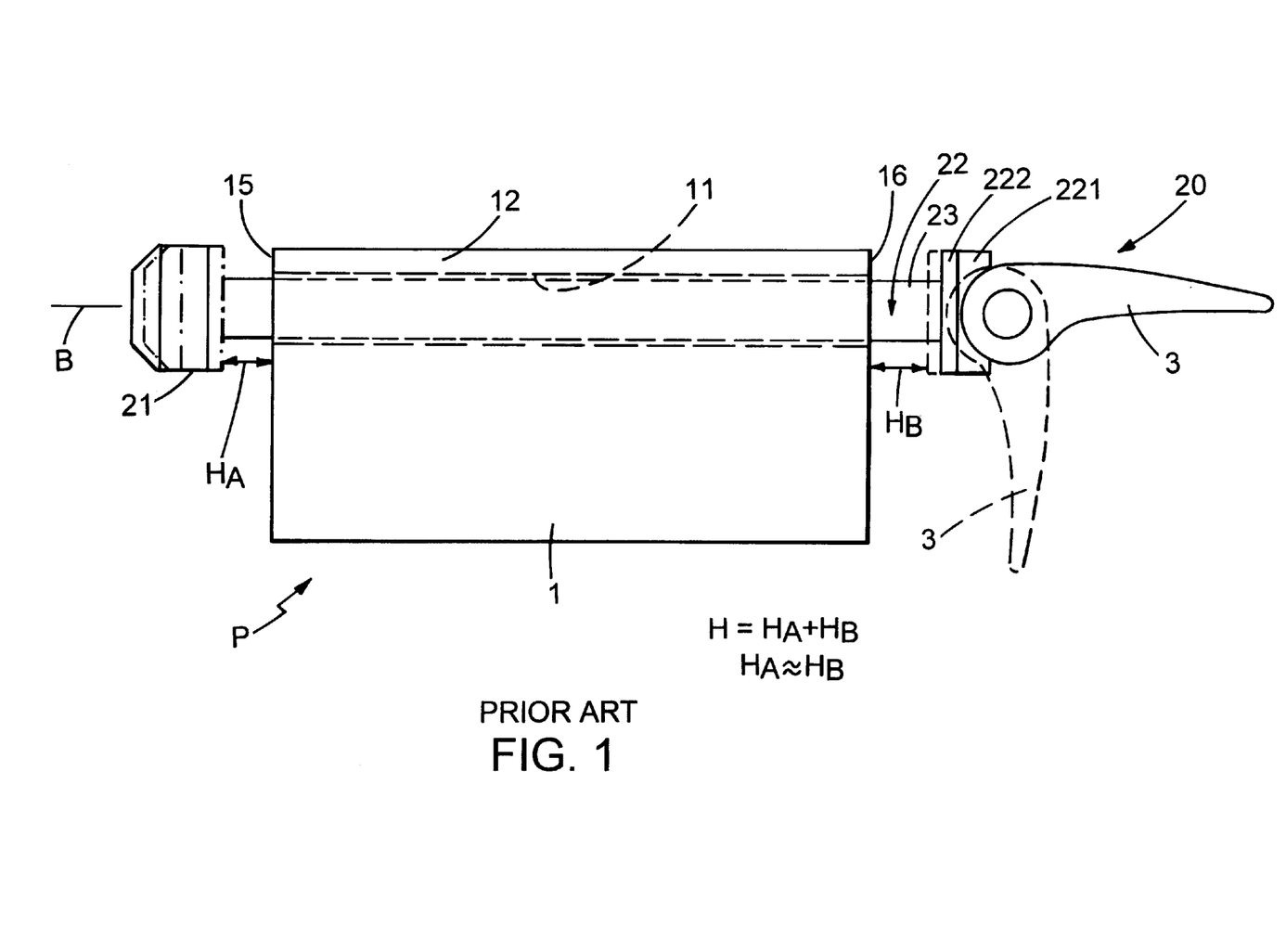
FIG. 1 is a perspective view of a prior art bicycle carrier fastening bracket.
Figure 1A:
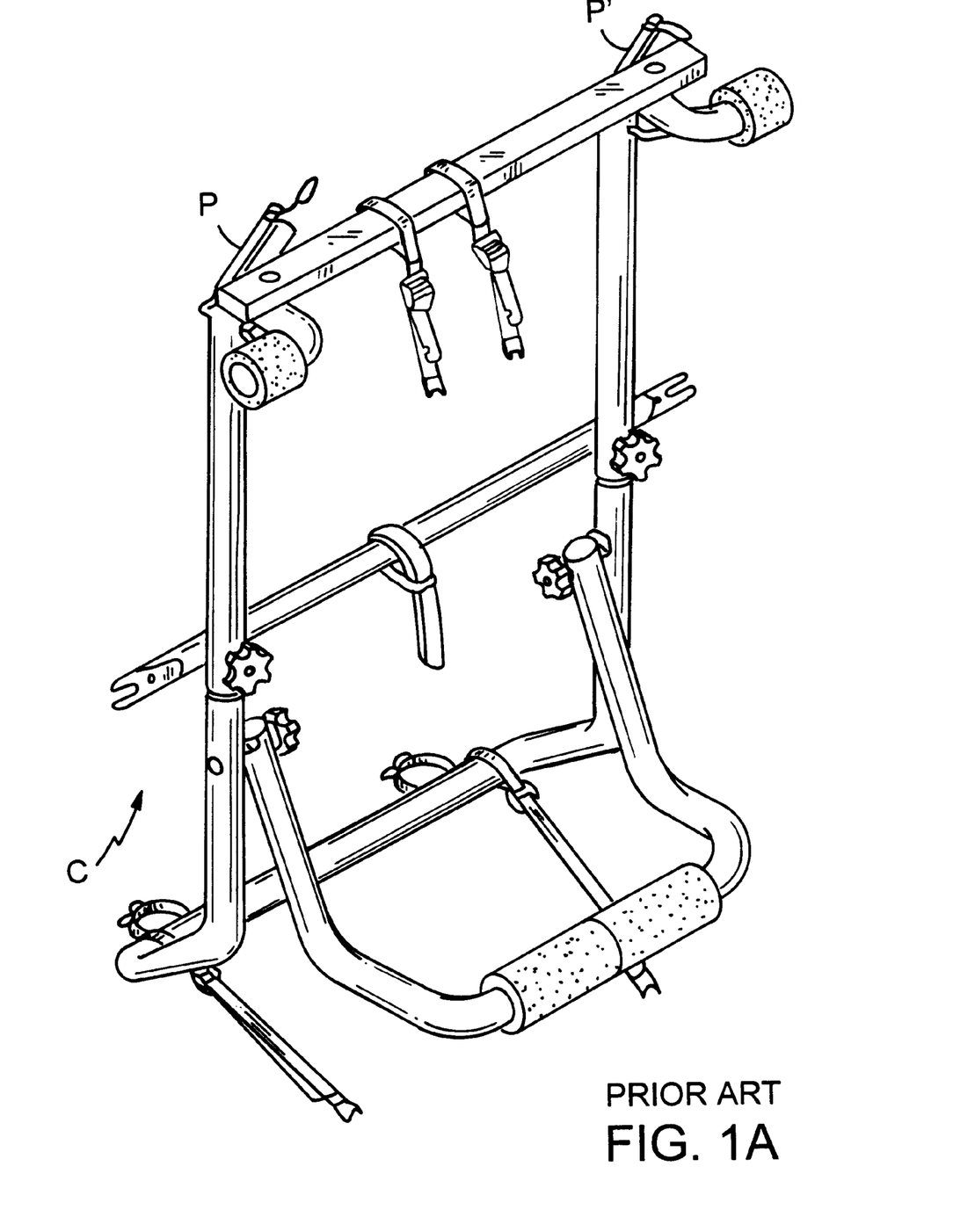
FIG. 1A is a perspective view of a bicycle carrier equipped with the prior art bicycle carrier fastening bracket of FIG. 1.

Referring to FIG. 1, a prior art bicycle carrier fastening bracket, P, consists of a main body 1 with a tube 12 defining a tube hole 11 for receiving a threaded rod 22 of a fast releasing assembly 20. The fast releasing assembly also consists of a nut 21, a head end 221 of the threaded rod 22 and an associated head end washer 222, and a handle 3 mounted to the head 221, such that each of the nut 21 and the head end washer 222 defines, with the adjacent opposed end 15, 16, respectively, of the main body 1, a distance, $H_A$ and $H_B$, respectively, by making use of the appropriate engagement of the nut 21 with the threaded rod 22. The handle 3 has an eccentric design to facilitate displacement of the head end washer 222 relative to the head end 221 when the handle 3 is moved inward or outward. As a result, the sum distance, H (i.e. $H_A+H_B$), can be compressed (dashed line positions) to facilitate secure mounting of the bicycle front fork. Referring also to FIG. 1A, the prior art bicycle carrier fastening brackets, P, P', are shown attached to a bicycle carrier, C, for mounting upon a vehicle trunk lid (e.g., see FIG. 7).

In prior art bicycle carrier fastening brackets, e.g., as just described, the shank 23 of threaded rod 22 is loosely cooperated with the tube hole 11, so it is prone to sliding in the tube hole, thereby resulting in an uncertain size of the fastening distances, $H_A$ and $H_B$, maintained between the nut 21 and the washer 222 associated with the bolt head 221 with the opposed ends 15, 16, respectively, of the main body 1. As a result, the bicycle front fork can not be directly located unless the distances, $H_A$ and $H_B$, are readjusted by moving the threaded rod 22. In the process of readjusting the distances, one must typically lift the bicycle with one hand to remove pressure on the threaded rod while the axial position of the threaded rod 22 is readjusted with the other hand. Such a readjustment of the distances, $H_A$ and $H_B$, can cause a great deal of physical hardship and inconvenience.

In addition, when the handle 3 is moved outward, it is aligned with the axis, B, of the threaded rod 22. However, when the handle 3 is moved inward, the handle 3 and the threaded rod 22 are disposed almost perpendicular to each other, with the handle 3 jutted out and suspended (dashed line in FIG. 1). As a result, the handle 3 is rather vulnerable to interference by an external force, such that the bicycle front fork is no longer secured by the inward movement of the handle 3 to compress the sum distance, H.

Also, the operation of the fast releasing assembly 20 is controlled by the handle 3 for locating or releasing the bicycle front fork. In other words, the prior art bicycle carrier fastening bracket is not theft resistant.

SUMMARY OF THE INVENTION

According to the invention, a bicycle carrier fastening bracket comprises a main fastening body having a base, a leg extending from the base, and a tube supported by the leg and defining a tube hole, a fast releasing assembly comprising a threaded rod disposed for axial movement within the tube hole, the threaded rod having a threaded end engaged with a fast releasing nut and a head end and associated head end washer, opposite the threaded end, and a handle capable of eccentric motion for fastening the fast release assembly, and an arresting washer received in a slot of predetermined axial length defined by the tube in a midsegment thereof. The leg, adjacent to the head end of the threaded rod, defines a round hole. The handle, comprising a grip, is fastened with an eccentric body disposed at a predetermined inclination, the grip defining a locking hole corresponding in diameter to the round hole. The eccentric body of the handle controls a distance between each of the head end washer on the threaded rod and the nut with its respective opposite end of the main fastening body, each distance adapted to be shortened to clamp a bicycle front fork when the handle is rotated such that the grip is rested against the leg, and such that the locking hole of the grip is corresponding in location to the round hole of the main fastening body, thereby to facilitate installation of a lock and to confine displacement of the grip. The arresting washer impedes axial movement of the threaded rod when the arresting washer is in a normal state with the bicycle front fork unfastened, thereby restricting the threaded rod from sliding axially in the tube hole and maintaining each distance to enable the bicycle front fork to be fastened.

Preferred embodiments of the invention may include one or more of the following additional features. The arresting washer is integrally formed of a pliable plastic material with an inner hole receiving the threaded rod, the inner hole being smaller in diameter than the threaded rod, the arresting washer having an outer diameter conforming to a tubular body diameter of the tube for locating the threaded rod and for effecting the confining action of the slot, thereby positioning the arresting washer to impede movement of the threaded rod to resist the threaded rod from sliding in the tube hole. The threaded rod defines, in a shank thereof, a circumferential groove dimensioned to receive an arresting washer for insertion into the tube hole for impeding axial movement of the threaded rod.

An objective of the present invention is to provide an improved bicycle carrier fastening bracket consisting of a main body with a slot provided in the tube for accommodating an arresting washer capable of impeding sliding of the fast releasing bolt. The tube body is provided, in the leg, with a round hole for installing a lock. The head of the threaded rod is fastened vertically with an eccentric body of the handle. The handle is thus parallel to the threaded rod and provided with a locking hole. The handle is moved horizontally toward the main body, such that the washer associated with the bolt head and the nut are caused to displace in opposite directions so as to shorten the sum distance between the bolt head washer and the nut with both ends of the main body, thereby to facilitate holding of the bicycle front fork. In the meantime, the locking hole of the handle aligns with the round hole of the main body to facilitate the locating of the lock. The front fork of a bicycle can thus be located easily and securely.

Another objective of the present invention is to provide an improved bicycle carrier fastening bracket. The arresting washer of the present invention is made integrally of a pliable plastic material and provided therein with a rod diametrical shaped and smaller than the fast releasing bolt (threaded rod), and having an outer diameter conforming to the circumferential diameter of the tubular body of the tube for locating securely the bolt, and for effecting the position confining action of the slot of the tube body. As a result, the arresting washer is capable of obstructing the bolt, so as to prevent the bolt from sliding in the tube hole.

Still another objective of the present invention is to provide an improved bicycle carrier fastening bracket with a lock for fastening securely the handle with the main body, so as to prevent the bicycle carrier fastening bracket from being tampered with by an unauthorized person.

The structures, features and operations of the present invention will be more readily understood upon a thoughtful deliberation of the following detailed description of a presently preferred embodiment of the invention, with reference to the accompanying drawings.

DESCRIPTION OF THE PREFERRED EMBODIMENTS

Figure 2:
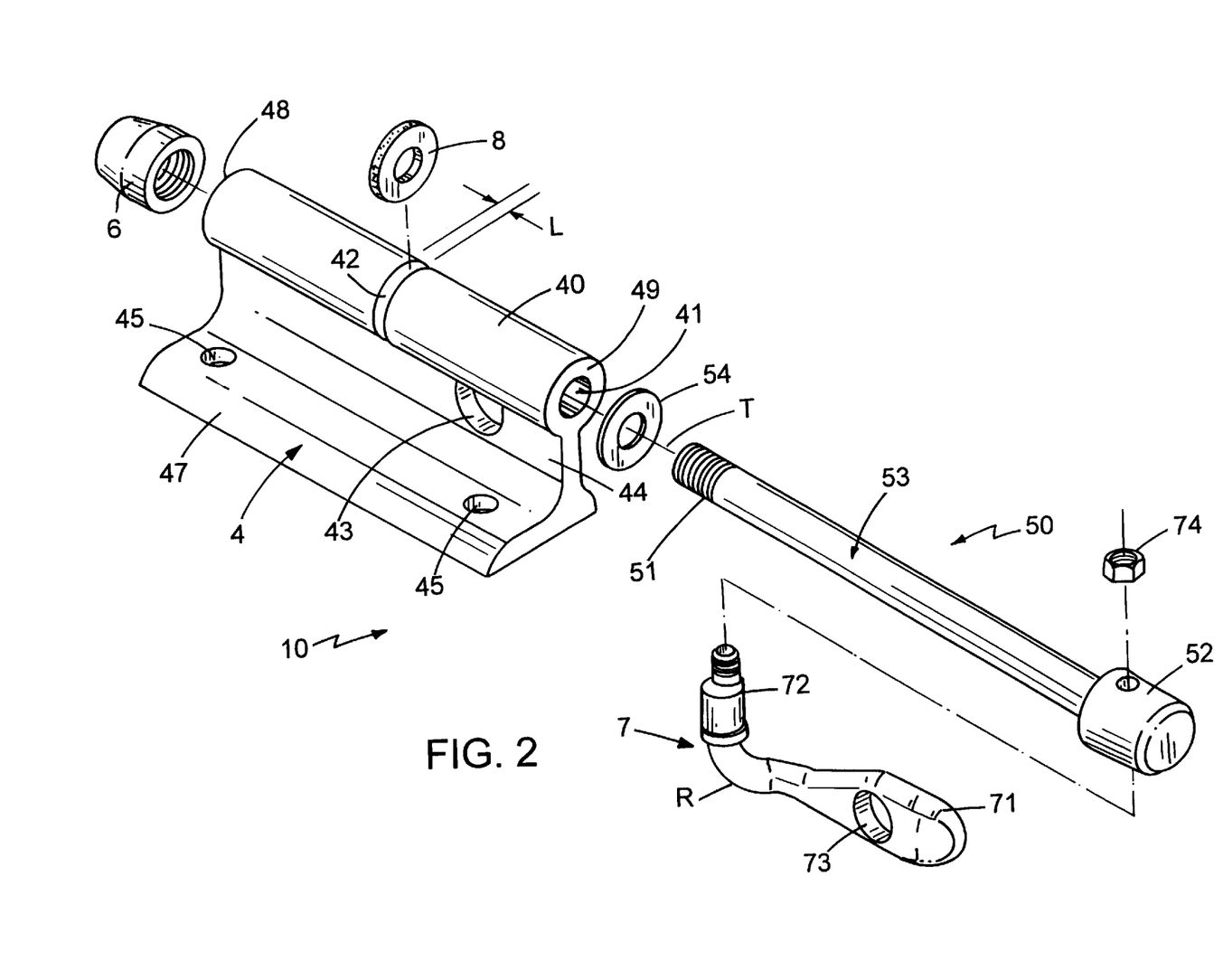
FIG. 2 is an exploded view of a bicycle carrier fastening bracket of the present invention.
Figure 3:
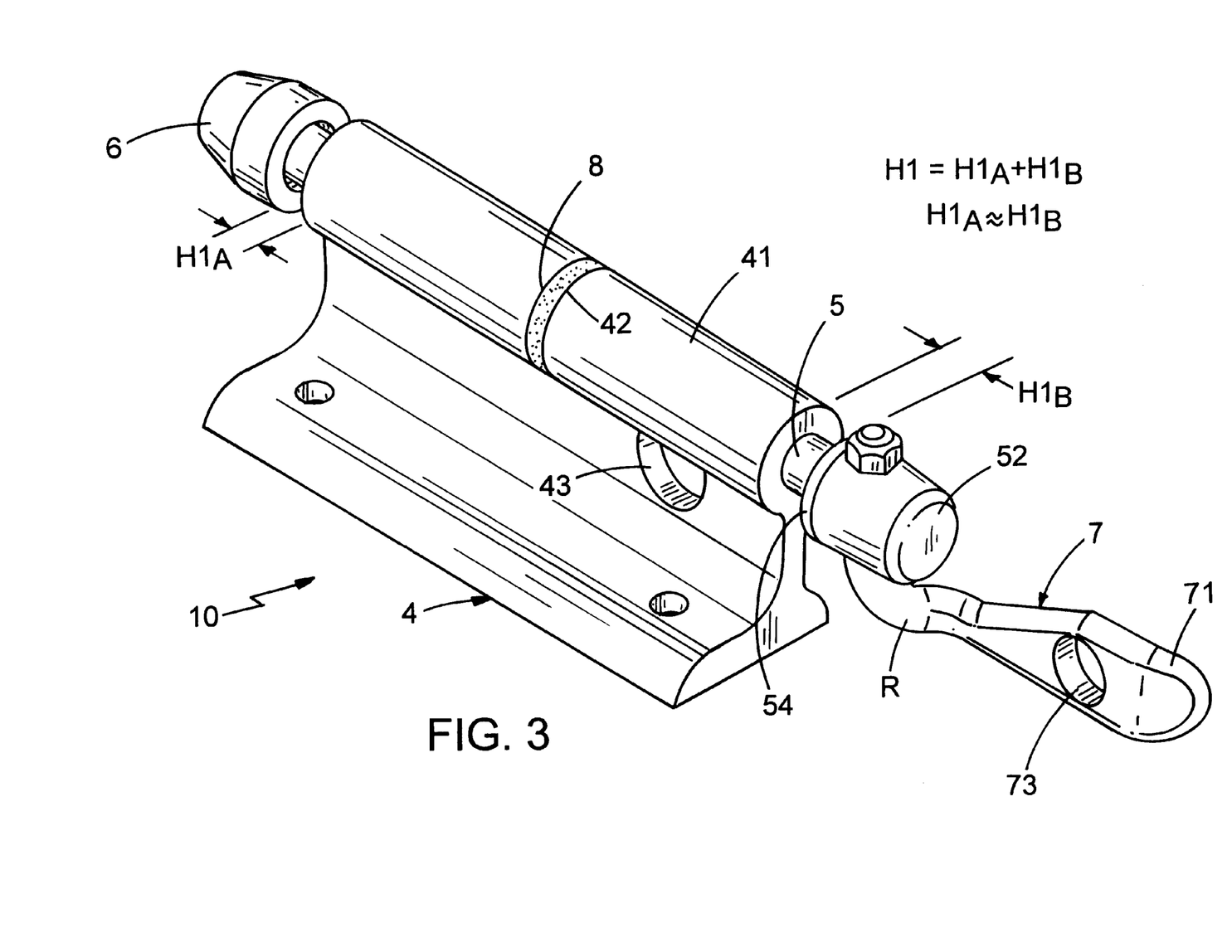
FIG. 3 is a perspective view of a bicycle carrier fastening bracket of FIG. 2.

Referring to FIGS. 2 and 3, the bicycle carrier fastening bracket 10 of the present invention has a main fastening body 4 with a tube 40 at the top portion thereof defining a tube hole 41 for receiving a threaded rod 53 of a fast releasing assembly 5. The threaded rod 53 has a threaded end 51 engaged with a fast releasing nut 6 and a head end 52 and associated washer 54. A handle 7 capable of eccentric action is fastened to the head end 52.

The tube 40 of the main fastening body 4 has a slot 42 of a predetermined axial length, L, midsegment, and a round hole 43 in the leg 44, adjacent to the main body end 49 opposite to bolt head 52. An arresting washer 8 disposed in the slot 42 is made integrally of a pliable plastic material with an inner rod-receiving hole 81 of diametrical size and/or shape smaller than the threaded rod 53, for receiving threaded rod 53 in interference fit. The outer diameter of the washer 8 conforms to the tubular body round diameter of the tube 40 for locating the threaded rod 53 and for effecting the position-confining action of the slot 42. As a result, the arresting washer 8 is capable of impeding axial movement (along axis, T) of the threaded rod 53. The handle 7, with a grip 71 of a threaded construction, is connected by an eccentric body 72 disposed at a predetermined inclination, R, secured by nut 74. The grip 71 is provided with a locking hole 73 corresponding in diameter to the main fastening body round hole 43. The fastening bracket 10 of the present invention is thus formed for fastening of the front forks 9 of a bicycle, as shown in FIG. 5.

Figure 4:
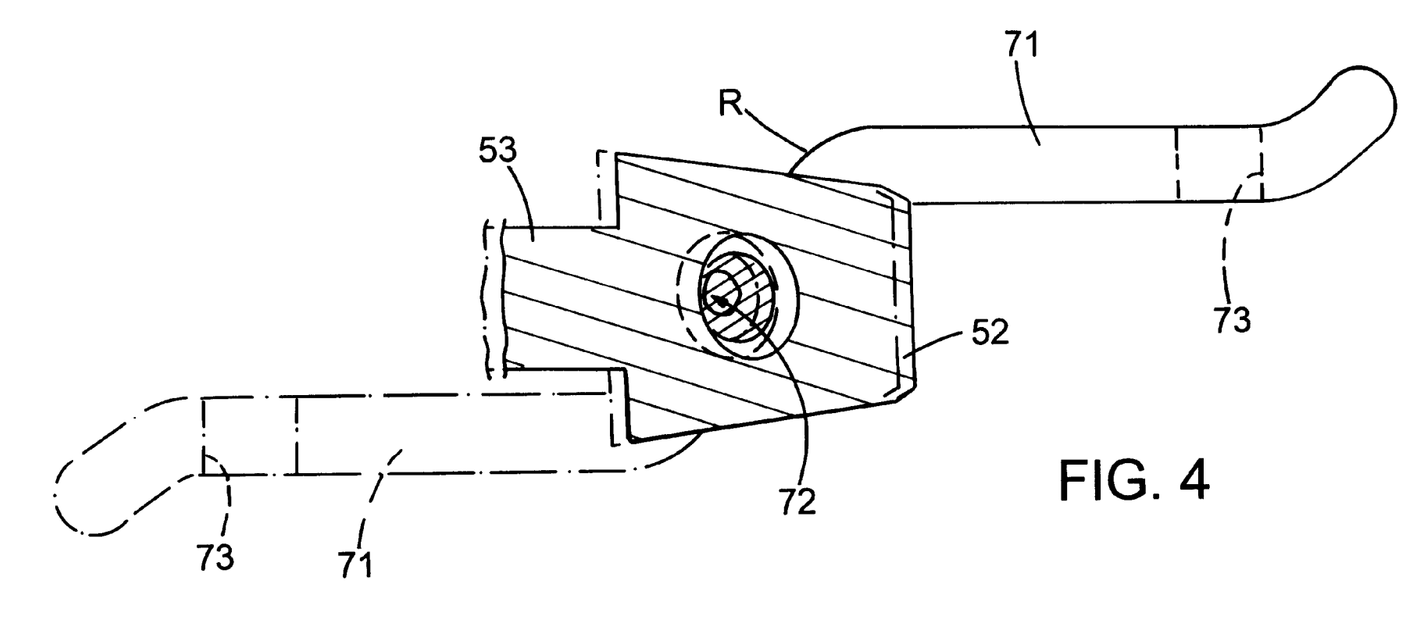
FIG. 4 is a top section view of the bolt head end showing a schematic view of the handle of the bicycle carrier fastening bracket of the present invention in operation, between open position (solid line) and secured position (dashed line)
Figure 5:
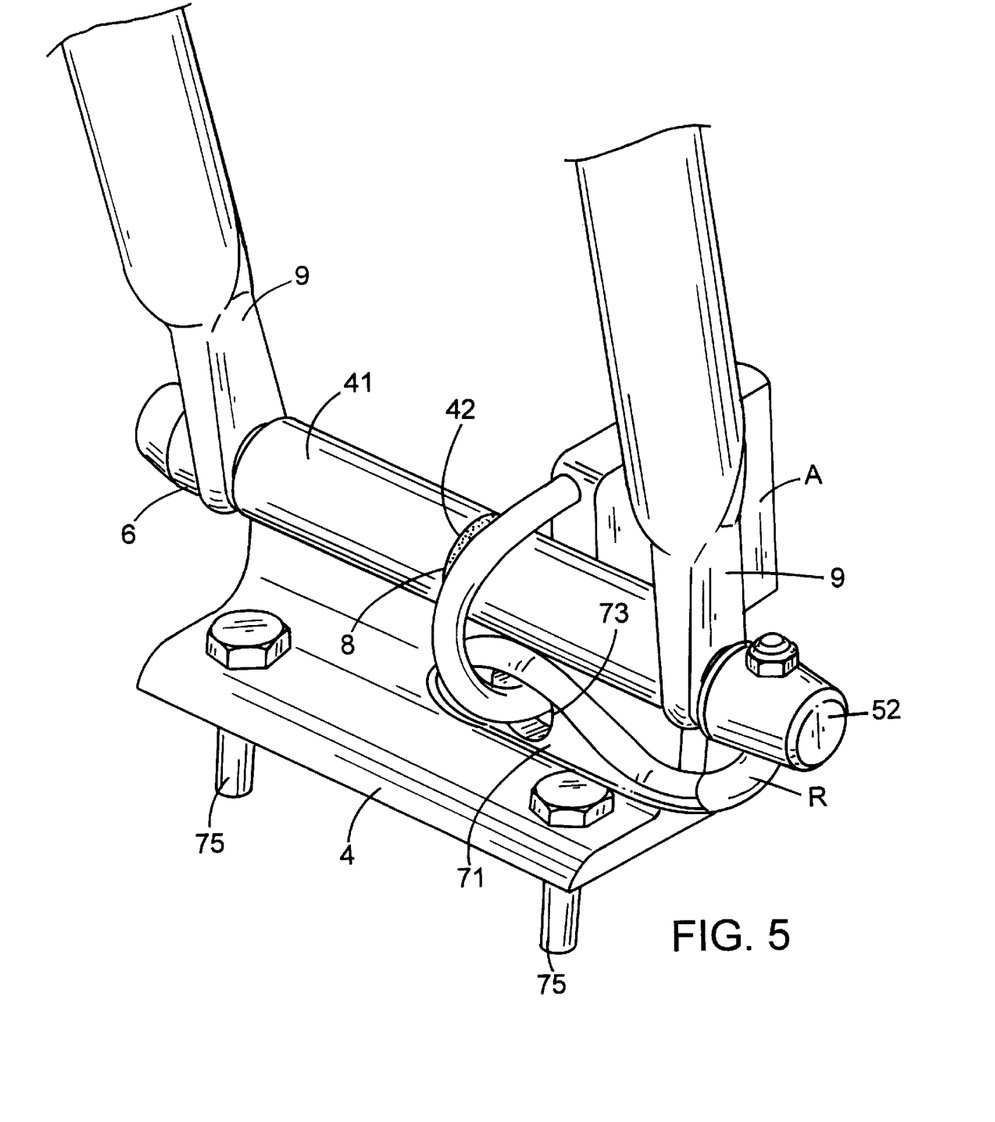
FIG. 5 shows a perspective view of the bicycle carrier fastening bracket of the present invention in use to secure the front fork of a bicycle.

Referring now to FIGS. 4 and 5, the eccentric body 72 of the handle 7 controls the distances, $H1_A$ and $H1_B$, between the nut 6 and the head end washer 54 and the respective opposed ends 48, 49 of the main body 4 (as shown in FIG. 2). When the handle 7 is rotated outward, the sum distance, H1 (i.e. $H1_A + H1_B$), is expanded or increased. When the handle 7 is rotated inwardly toward the main body 4, the sum distance, H1, is reduced for clamping the bicycle front forks 9. Upon completion of fastening operation, the grip 71 is rested against the leg 44 of the tube 40 of the main body 4, such that the locking hole 73 is corresponding or aligned in location to the main body round hole 43 so as to facilitate the installation of a lock, A, for confining the displacement motion of the grip 71 (as shown in FIG. 5). Before the bicycle front forks 9 are fastened, the arresting washer 8 is in a normal state of impeding the threaded rod 53, thereby restricting the threaded rod 53 from sliding axially in the tube main body hole 41, and keeping the sum distant, H1, constant when the handle 7 is not rotated. In this manner, fastening of the bicycle front forks 9 are facilitated without the trouble of adjusting the sum distance, H1, as is the case with prior art bicycle carrier fastening brackets.

Figure 6:
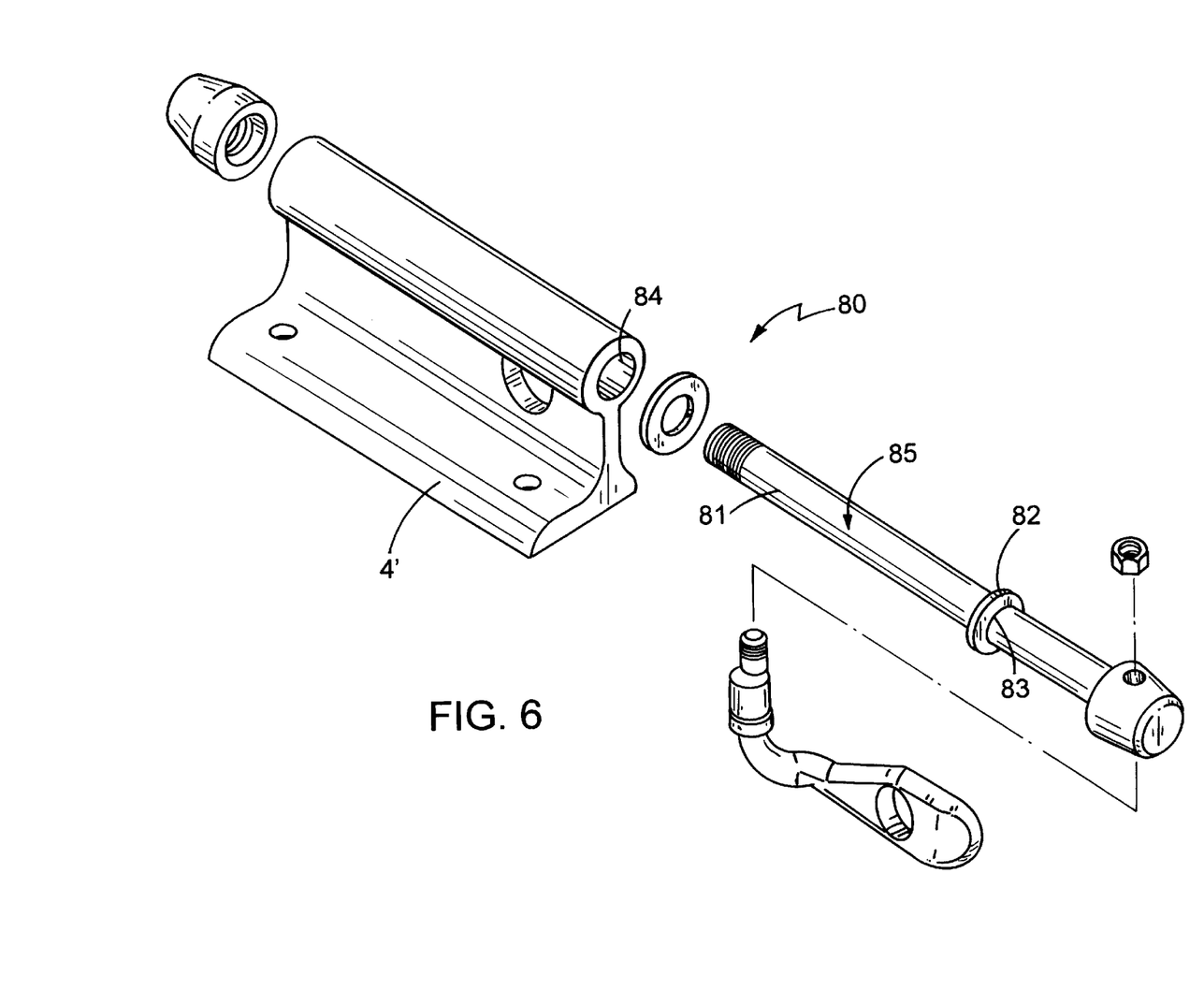
FIG. 6 shows an exploded view of another embodiment of the bicycle carrier fastening bracket of the present invention.

Now referring to FIG. 6 showing another embodiment of the invention, in a bicycle carrier fastening bracket 80, the rod body (shank) 81 of the threaded rod (bolt) 85 to be inserted into the tube hole 84 of the main body 4', is provided with a circumferential groove 83 dimensioned to receive an arresting washer 82 which brings about an impeding effect on axial movement of the threaded rod 85 without the trouble of adjusting the distance, again as is the case with prior art bicycle carrier fastening brackets.

Figure 7:
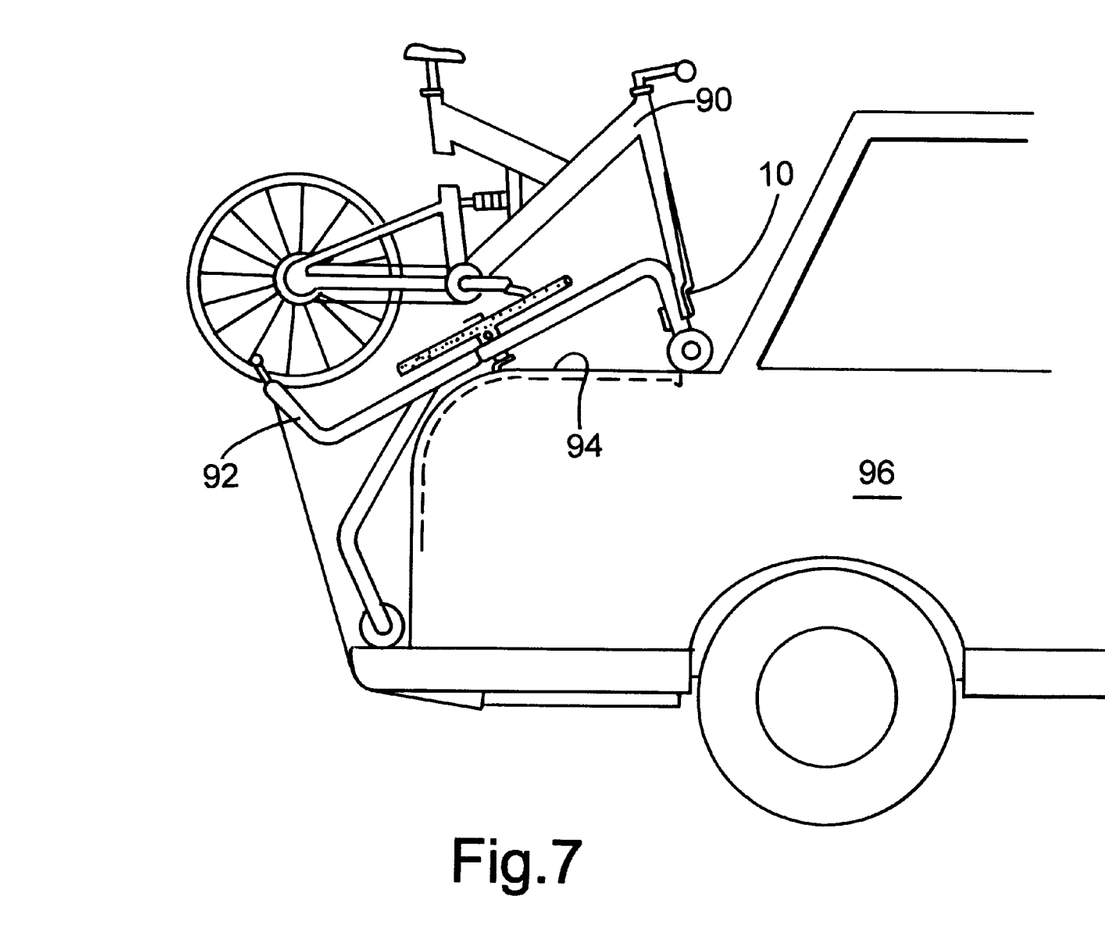
FIG. 7 shows a schematic view of a bicycle carrier mounted to a vehicle and carrying a bicycle secured with a bicycle carrier fastening bracket of the present invention.

Referring finally to FIG. 7, a bicycle 90 placed upon a bicycle carrier 92 mounted upon the trunk lid 94 of a vehicle 96 and secured in the manner described above using a bicycle carrier fastener bracket 10 of the invention. The bicycle carrier fastener bracket 10 is fixedly secured to the bicycle carrier 92, e.g., by bolts 75 (FIG. 5) or other suitable fasteners engaged through holes 45 (FIG. 2) in the base 47 of the fastening bracket base 4.

As described above, the present invention enhances the function of the bicycle carrier fastening bracket, and restricts the threaded rod from sliding and the handle from jutting out. In addition, the present invention provides a lock to restrict the handle from sliding and to protect the bicycle from being stolen from the bracket to which it is fastened.

Other embodiments of the invention are within the following claims.

What is claimed is:

1. A bicycle carrier fastening bracket comprising:
   a main fastening body having a base, a leg extending from said base, and a tube supported by said leg and defining a tube hole,
   a fast releasing assembly comprising a threaded rod disposed for axial movement within said tube hole, said threaded rod having a threaded end engaged with a fast releasing nut and a head end and associated head end washer, opposite said threaded end, and a handle capable of eccentric motion for fastening said fast releasing assembly, and
   an arresting washer received on said threaded rod and along a predetermined axial length of said tube;
   said leg, adjacent to said head end of said threaded rod, defining a round hole,
   said handle comprising a grip and fastened with an eccentric body disposed at a predetermined inclination, said grip defining a locking hole corresponding in diameter to said round hole, said eccentric body of said handle controlling a distance between each of said head end washer on said threaded rod and said nut and its respective opposite end of said main fastening body, each said distance adapted to be shortened to clamp a bicycle front fork when said handle is rotated such that said grip is rested against said leg, and such that said locking hole of said grip is corresponding in location to said round hole of said main fastening body, thereby to facilitate installation of a lock and to confine displacement of said grip, and said arresting washer impeding movement of said threaded rod when said arresting washer is in a normal state with the bicycle front fork unfastened, thereby restricting said threaded rod from sliding in said tube hole and maintaining each said distance to enable the bicycle front fork to be fastened.

2. The bicycle carrier fastening bracket of claim 1, wherein said arresting washer is received in a slot of said tube and is integrally formed of a pliable plastic material with an inner hole receiving said threaded rod, said inner hole being smaller in diameter than said threaded rod, said arresting washer having an outer diameter conforming to a tubular body diameter of said tube for locating said threaded rod and for effecting a confining action of said slot, thereby positioning said arresting washer to impede movement of said threaded rod to resist said threaded rod from sliding in said tube hole.

3. The bicycle carrier fastening bracket of claim 1, wherein said threaded rod defines, in a shank thereof, a circumferential groove dimensioned to received said arresting washer for insertion into said tube hole for impeding movement of said threaded rod.

* * * * *